United States Patent
Naud et al.

(10) Patent No.: US 10,523,590 B2
(45) Date of Patent: Dec. 31, 2019

(54) CHANNEL-BASED MANDATORY ACCESS CONTROLS

(71) Applicant: 2236008 Ontario Inc., Waterloo (CA)

(72) Inventors: Eric Serge Naud, Ottawa (CA); Roger Francis Maclean, Ottawa (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 265 days.

(21) Appl. No.: 15/445,657

(22) Filed: Feb. 28, 2017

(65) Prior Publication Data
US 2018/0123976 A1     May 3, 2018

Related U.S. Application Data

(60) Provisional application No. 62/414,491, filed on Oct. 28, 2016.

(51) Int. Cl.
*H04L 12/927*     (2013.01)
*G06F 21/62*     (2013.01)
(Continued)

(52) U.S. Cl.
CPC ........ *H04L 47/808* (2013.01); *G06F 21/6218* (2013.01); *H04L 47/801* (2013.01);
(Continued)

(58) Field of Classification Search
CPC ..... H04L 47/808; H04L 47/801; H04L 51/04; H04W 12/08; G06F 21/6218;
(Continued)

(56) References Cited

U.S. PATENT DOCUMENTS

| 5,317,746 A | 5/1994 | Watanabe |
| 5,590,266 A | 12/1996 | Carson et al. |

(Continued)

FOREIGN PATENT DOCUMENTS

| EP | 2 159 729 A1 | 3/2010 |
| EP | 2159729 A1 | 3/2010 |

(Continued)

OTHER PUBLICATIONS

Alfreddd, open connections (sockets) for process, Jun 20, 2012, GitHub. (Year: 2012).*

(Continued)

*Primary Examiner* — Brian J. Gillis
*Assistant Examiner* — Chhian (Amy) Ling
(74) *Attorney, Agent, or Firm* — Rowand LLP

(57) ABSTRACT

Systems and methods for enforcing mandatory access control in a message-based operating system are provided. Calls to operating system logic may be passed as messages over communication channels in a message-based operating system. A first process configured to receive a message via a communication channel in a message-based operation system may be identified. In addition, the communication channel may be identified. Further, an access rule may be identified. The access rule may be a rule to govern access to the communication channel. The access to the communication channel by the second process may be controlled based on the access rule. The access may be controlled in a kernel of a message-based operating system. The second process may be configured to execute invocation logic. The invocation logic may be executable to send the message via the communication channel.

19 Claims, 6 Drawing Sheets

(51) Int. Cl.
*H04W 12/08* (2009.01)
*H04L 12/58* (2006.01)
*G06F 21/60* (2013.01)

(52) U.S. Cl.
CPC .............. *H04L 51/04* (2013.01); *H04W 12/08* (2013.01); *G06F 21/604* (2013.01); *G06F 2221/2113* (2013.01); *G06F 2221/2141* (2013.01); *G06F 2221/2149* (2013.01)

(58) Field of Classification Search
CPC ........... G06F 21/604; G06F 2221/2113; G06F 2221/2141; G06F 2221/2149
See application file for complete search history.

(56) References Cited

U.S. PATENT DOCUMENTS

| | | | |
|---|---|---|---|
| 5,621,731 | A | 4/1997 | Dale et al. |
| 6,604,123 | B1 | 8/2003 | Bruno et al. |
| 6,981,140 | B1 | 12/2005 | Choo |
| 7,415,484 | B1 | 8/2008 | Tulkoff et al. |
| 7,962,950 | B2 | 6/2011 | Choo et al. |
| 9,146,787 | B2 | 9/2015 | Zhu et al. |
| 2003/0208493 | A1 | 11/2003 | Hall et al. |
| 2004/0123145 | A1 | 6/2004 | Baffes et al. |
| 2004/0205769 | A1* | 10/2004 | Ruutu ................. H04L 67/10 719/313 |
| 2005/0198034 | A1 | 9/2005 | Boyer |
| 2005/0228916 | A1 | 10/2005 | Telesco |
| 2008/0071708 | A1 | 3/2008 | Dara et al. |
| 2008/0184329 | A1 | 7/2008 | Cross et al. |
| 2008/0235628 | A1 | 9/2008 | Faught |
| 2009/0037929 | A1* | 2/2009 | Shimko ................. G06F 21/606 719/312 |
| 2010/0042722 | A1 | 2/2010 | Klissner |
| 2010/0088739 | A1 | 4/2010 | Hall et al. |
| 2010/0121927 | A1 | 5/2010 | Zhang et al. |
| 2010/0132012 | A1 | 5/2010 | Van Riel et al. |
| 2011/0126281 | A1 | 5/2011 | Ben-Zvi et al. |
| 2012/0137375 | A1 | 5/2012 | Ramachandran et al. |
| 2013/0247185 | A1 | 9/2013 | Viscuso et al. |
| 2014/0013395 | A1* | 1/2014 | Yerxa ................. H04W 12/08 726/4 |
| 2014/0059206 | A1* | 2/2014 | Venkateshwaran ........................ H04L 43/0882 709/224 |
| 2015/0304357 | A1 | 10/2015 | Paris et al. |
| 2016/0269373 | A1* | 9/2016 | White ................. H04L 63/10 |
| 2017/0244628 | A1 | 8/2017 | Chen |
| 2017/0257228 | A1 | 9/2017 | Chen |
| 2018/0004690 | A1 | 1/2018 | Kaminski et al. |
| 2018/0006891 | A1* | 1/2018 | Zhang ................. H04L 41/0893 |
| 2018/0239921 | A1 | 8/2018 | Goyal et al. |

FOREIGN PATENT DOCUMENTS

| | | |
|---|---|---|
| WO | 2011062743 | 5/2011 |
| WO | 2011062743 A2 | 5/2011 |
| WO | WO 2011/062743 A2 | 5/2011 |

OTHER PUBLICATIONS

Branstad, M., Tajalli, H., Mayer, F., Dalva, D., "Access Mediation in a Message Passing Kernel," May 1, 1989, pp. 66-72, Proceedings, 1989 IEEE Symposium on Security and Privacy, May 1-3, 1989, Oakland, CA, ISBN: 0-8186-1939-2, retrieved from the Internet at URL: Http://ieeexplore.ieee.org/stamp/stamp.jsp?tp=arnumer=36278.

Extended European Search Report, dated Nov. 21, 2017, pp. 1-9, issued in European Patent Application No. 17179875.4, European Patent Office, Munich, Germany.

Schaufler, Casey, "The Simplified Mandatory Access Control Kernel," downloaded Sep. 23, 2016, pp. 1-11, URL: http://schaufler-ca.com/yahoo_site_admin/assets/docs/SmackWhitePaper.257153003.pdf.

EPO, Communication pursuant to Article 94(3) EPC relating application No. 17179875.4 dated Dec. 19, 2018.

"TypeRules," downloaded Mar. 9, 2017, pp. 1-6, SELinuxProject, available at http://selinuxproject.org/page/TypeRules#type_change_Rule.

"Relabeling a File or Directory," downloaded Mar. 9, 2017, pp. 1-3, CENTOS, available at https://www.centos.org/docs/5/html/5.2/Deployment_Guide/sec-sel-file-relabel.html.

USPTO, Office Action relating to U.S. Appl. No. 15/454,848 dated Feb. 14, 2019.

EPO, EP Office Action relating to EP application No. 17198481.8, dated Jul. 5, 2019 Jul. 5, 2019.

EPO, Communication Pursuant to Article 94(3) EPC relating to EP application No. 17179875.4 dated Sep. 19, 2019.

* cited by examiner

CHANNEL-BASED MANDATORY ACCESS CONTROLS

This application claims the benefit of U.S. Provisional patent application 62/414,491 filed Oct. 28, 2016, the contents of which are incorporated by reference.

TECHNICAL FIELD

This disclosure relates to operating systems and, in particular, to mandatory access control in message-based operating systems.

BACKGROUND

In message-based operating systems, the calling or invocation of programmatic procedures of the operating system involves a messaging system. The invocations of programmatic procedures of the operating system result in corresponding messages being passed through the messaging system from a sender process to a receiver channel, and ultimately to a receiver process.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Message-based operating systems are exposed to numerous security vulnerabilities arising from the communication of messages between system resources over communication channels. For example, messages may be inadvertently or maliciously communicated to system resources over unprotected communication channels, potentially causing a security breach on message-based operating systems. Present approaches to mandatory access control fail to adequately address security enforcement in message-based operating systems.

Methods and systems for enforcing mandatory access control in a message-based operating system are provided that may address one or more computer security vulnerabilities. By way of an introductory example, calls to operating system logic may be passed as messages over communication channels in a message-based operating system. A first process configured to receive a message via a communication channel in a message-based operation system may be identified. In addition, the communication channel may be identified. Further, an access rule may be identified. The access rule may be a rule to govern access to the communication channel. The access to the communication channel by the second process may be controlled based on the access rule. The access may be controlled in a kernel of a message-based operating system. The second process may be configured to execute invocation logic. The invocation logic may be executable to send the message to the communication channel.

One interesting feature of the systems and methods described below may be that communication channels of a message-based operating system may be subject to mandatory access control. Alternatively or in addition, processes configured to receive messages from any of the communication channels may be protected by controlling the access to the communication channels.

Figure 1:
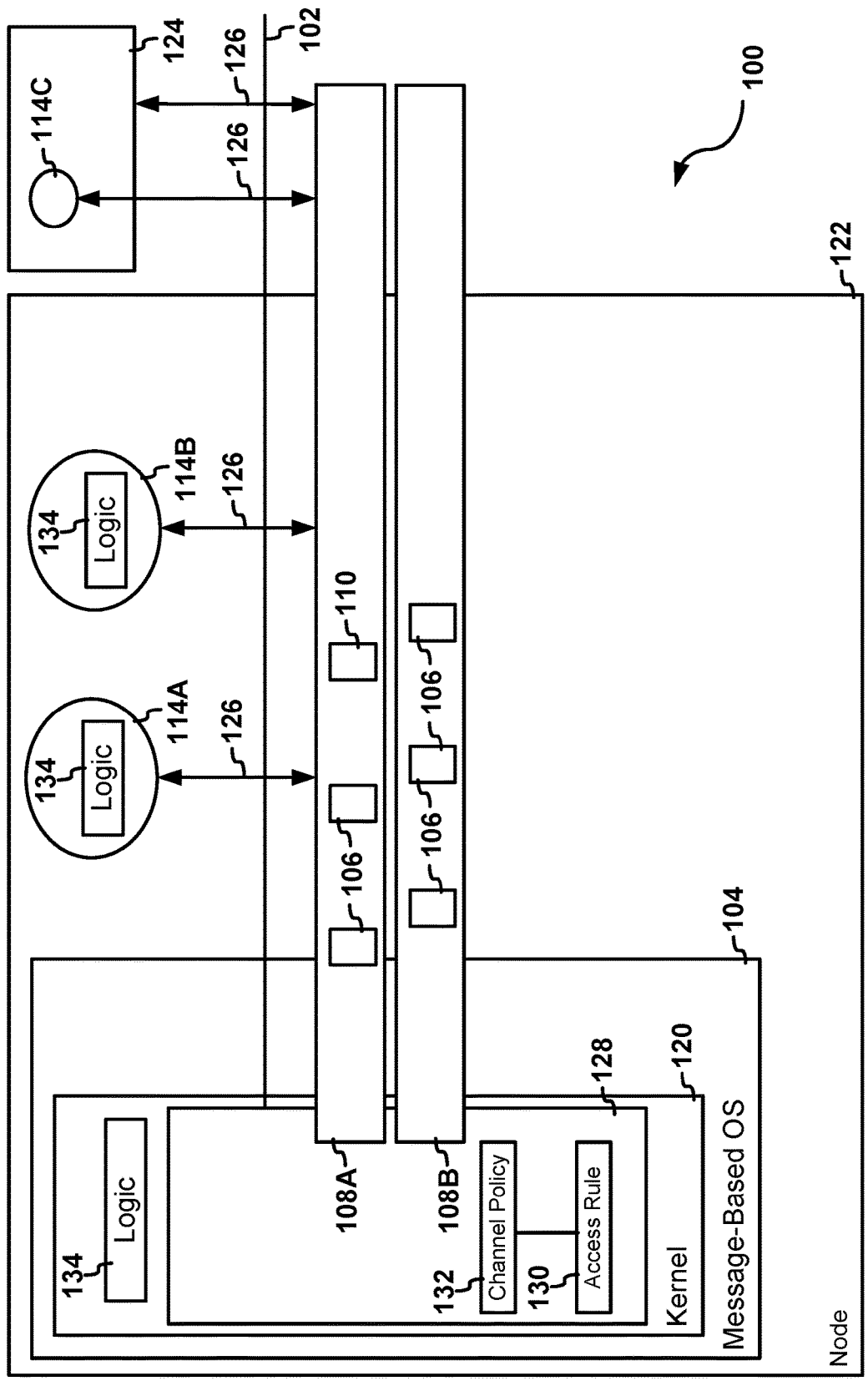
FIG. 1 illustrates an example of a system to enforce mandatory access control in a message-based operating system.

FIG. 1 illustrates an example of a system 100 to enforce mandatory access control 102 in a message-based operating system 104. The message-based operating system 104 may be any operating system where all or at least a majority of calls to operating system logic (in other words, invocations of programmatic procedures included in the operating system's application programming interface) are passed as messages over communication channels 108. For example, in FIG. 1, the messages 106 are communicated over the communication channel 108A between system objects, such as processes 114. The term "processes" as used herein may mean threads as well as processes In the example illustrated in FIG. 1, the processes 114 may communicate with each other over the communication channels 108. For example, a first process 114A configured to communicate on the communication channel 108A may receive messages from a second process 114B configured to communicate messages on the communication channel 108A. Additionally or alternatively, a first node 122 may communicate with a second node 124 over the communication channels 108. For example, a third process 114C on the second node 124 may communicate a message 110 to the first process 114A on the first node 122. Additional arrangements of processes, nodes and communication channels may be implemented in other examples.

In message-based operating systems, it may be desirable to control access to functionality provided by processes. The mandatory access control 102 may be a security feature of the message-based operating system 104. In the example illustrated in FIG. 1, the mandatory access control 102 may control access 126 to the communication channel 108A. For example, the mandatory access control may control the access 126 of the first process 114A to the communication channel 108A. Additionally or alternatively, the mandatory access control many control the access 126 of a second process 114B to the communication channel 108A. In an additional example, the mandatory access control may control the access of the process 114C on the second node 124 to the communication channel 108A.

To enforce the mandatory access control 102, the system 100 may include a channel manager 128. The channel manager 128 may identify the first process 114A and the communication channel 108A. In addition, the channel manager 128 may identify an access rule 130 based on a channel policy 132. The access rule 130 may govern the access 126 to the communication channel 108A. The channel manager 128 may control the access 126 to the communication channel 108A based on the access rule 130. For example, the channel manager may control the access 126 to the communication channel 108A by the second process 114B. The second process 114B may be configured to send the message 110 to the communication channel 108A.

Alternatively or in addition, the channel manager 128 may control communication over the communication channel 108A between the nodes 122, 124. For example the first node 122 may communicate messages over the communication channel 108A. As another example, the second node 124 may communicate messages over the communication channel 108A. The channel manager 128 may control the access to the communication channel 108A by the first node 122. In addition, the channel manager 128 may control the access to the communication channel 108A by the second node 124. In other examples, the channel manager 128 may control the access 126 to the communication channel 108A of the third process 114C on the second node 124.

In a broad sense, the channel manager 128 may control the access 126 to the communication channels 108A by any system object. A system object may be any object configured to communicate with messages in the system 100. For example a system object may include the first process 114A, the second process 114B and the third process 114C. Additional examples of system objects include the kernel 120 and the nodes 122, 124. In addition, the communication channels 108 may be a system object. For example, a communication channel may communicate messages to another communication channel.

In some examples, the system 100 may include an open communication channel 108B. The channel manager 128 may determine that the open communication channel 108B is not subject to the mandatory access control 102. Accordingly, the access 126 to the open communication channel 108B may be authorized by default.

The messages 106 may be information exchanged on the message-based operating system 104. The messages 106 may represent calls to logic 134 that implements requested functionality. For example, invoking an operating system API, such as mmap( ), may result in a message being sent to a process that implements mmap( ). The messages 106 may include, for example, parameters used by the logic 134 perform operations. Additionally or alternatively, the logic 134 may create the messages 106. For example, the logic 134 of the second process 114B may create the message 110 that is configured to invoke the logic 134 of the first process 114A.

The messages 106 may follow a messaging format native to the message-based operating system 104. The messaging format may be conducive for communicating the messages 106 over the communication channels 108. For example, the messages 106 may include routing information used by the message-based operating system 104 to route the messages 106 between system objects. For example, the messages 106 may include process identifiers for the sending process and the receiving process. The routing information may include information related to a source process and a destination process. For example, the messages 106 may include a node identifier that identifies a node, such as the first node 122 or the second node 124 on which the source process and the destination process executes. Additionally or alternatively, the messages 106 may identify a communication channel the messages 106 are intended for. The messages 106 may include other information pertaining to the message-based operating system.

The communication channels 108 may be any virtual or physical communication path over which the messages 106 may travel in the message-based operating system 104. The communication channels 108 may include a resource or a group of resources for exchanging the messages 106 between system objects. For example, the communication channels 108 may include an implementation of inter-process communication. In some examples, the communication channels 108 may be implemented with files, signals, sockets, pipes, named pipes, semaphores, shared-memory, message queues, any other technique, or combinations of techniques, of message communication. Moreover, the implementation of each of the communication channels 108 may vary within the message-based operating system 104. For example, the communication channel 108A may be implemented with sockets while the open communication channel 108B may be implemented with message queues and shared-memory. Any other suitable implementation, combination of implementations, or technique may be used to implement the communication channels 108.

The messages 106 may be routed on the communication channels 108. For example, the message-based operating system 104 may route the messages 106 on the communication channels 108. In some examples, the kernel 120 of the message-based operating system 104 may route the messages 106 on the communication channels 108. Alternatively, the messages 106 may be routed by at least one of the processes 114.

The processes 114 may be instances of a computer program being executed. In some examples, the process may be made up of multiple threads of execution that execute instructions concurrently. The instructions may implement the logic 134 of the computer program. The processes 114 may execute on multiple nodes. For instance, the processes 114 may execute on the first node 122 and the second node 124. Moreover, the processes 114 may execute inside of the message-based operating system 104. Additionally or alternatively, the processes 114 may be executing outside of the message-based operating system 104 (as illustrated in FIG. 1).

The nodes 122, 124 may comprise any physical or virtual host. For example, the first node 122 may comprise a physical hardware device such as a computer, mobile phone, tablet, wearable device, vehicle, or other type of hardware. In some examples, the first node 122 may include or be included in a vehicle, such as a motor vehicle, an aircraft, a spacecraft, a watercraft, a railed vehicle, or any other type of vehicle. Alternatively, the first node 122 may comprise a virtual host, such as a virtual machine or a container, operating within the physical host. In some examples, the first node 122 and the second node 124 may be connected by a communications network (not shown). The communication channel 108A may be configured to communicate over the network.

The kernel 120 may be a core of the message-based operating system 104. The kernel 120 may implement operating system functionality. For example, the kernel 120 may implement operating system tasks such as, for example, certain aspects of inter-process communication, memory management, file system management, device driver management, or any other type of operating system functionality. The kernel 120 may implement all or a portion of the channel manager 128. For example, the channel manager 128 may control the access 126 to the communication channels 108 by system objects in the kernel 120 of the message-based operating system 104.

The kernel 120 may also include the logic 134 that implements requested functionality. Accordingly, the kernel 120 may be responsive to messages 106 communicated over the communication channels 108. Additionally, the kernel 120 may invoke logic outside of the kernel 120 with the messages 106 communicated on the communication channel 108A. For example, the kernel 120 may invoke the logic 134 of the second process 114B by communicating the message 110 over the communication channel 108A to the second process 114B. In addition, the logic 134 in the kernel 120 may be invoked by communicating the message 110 over the communication channel 108A.

The channel policy 132 may be a security policy indicative of how to enforce the mandatory access control 102. For example, the channel policy 132 may specify how to control the access 126 to the communication channels 108 by the system objects. The access rule 130 may be identified based on the channel policy 132. The channel policy 132 may include, or be associated with, the access rule 130. The access rule 130 may be indicative of a privilege to communicate over the communication channel 108A. For an example of the channel policy 132 and the access rule 130, see FIG. 3, which is described in detail below.

The access 126 to the communication channel 108A may be the ability to interact with the communication channel 108A. For example, the access 126 may be the ability to communicate the message 110 over the communication channel 108A. In a more specific example, the access 126 may be the ability to send the message 110 over the communication channel 108A. Additionally or alternatively, the access 126 may be the ability to receive the message 110 over the communication channel 108A. Additionally or alternatively, the access 126 may be the ability to create, read, write, or delete the message 110 on the communication channel 108A. Other examples of the access 126 may be the ability to connect to the communication channel 108A, the ability to establish a connection with the communication channel 108A, and the ability to engage the communication channel 108A in any manner of communication.

The logic 134 may be any form of logic implemented as computer executable instructions. The logic 134 may be responsive to the messages 106. For example, the logic 134 in the first process 114A may be responsive to the message 110 received from the communication channel 108A. Additionally or alternatively, the logic 134 may invoke other logic by sending the messages 106 over the communication channels 108. For example, the logic 134 of the second process 114B may invoke the logic 134 of the first process 114A by communicating the message 110 over the communication channel 108A.

In monolithic operating systems, operating system functionality traditionally is implemented in a kernel or in a privileged kernel space. In the message-based operating system 104, as described herein, operating system functionality may be implemented in processes that receive the messages 106 sent from calling processes. In some examples, the processes that implement the operating system functionality may execute in a user space instead of or in addition to the privileged kernel space. Because the user space represents an un-privileged memory space, it may be desirable to secure the operating system functionality. Operating system functionality may be secured with the system 100 to enforce the mandatory access control 102.

Figure 2:
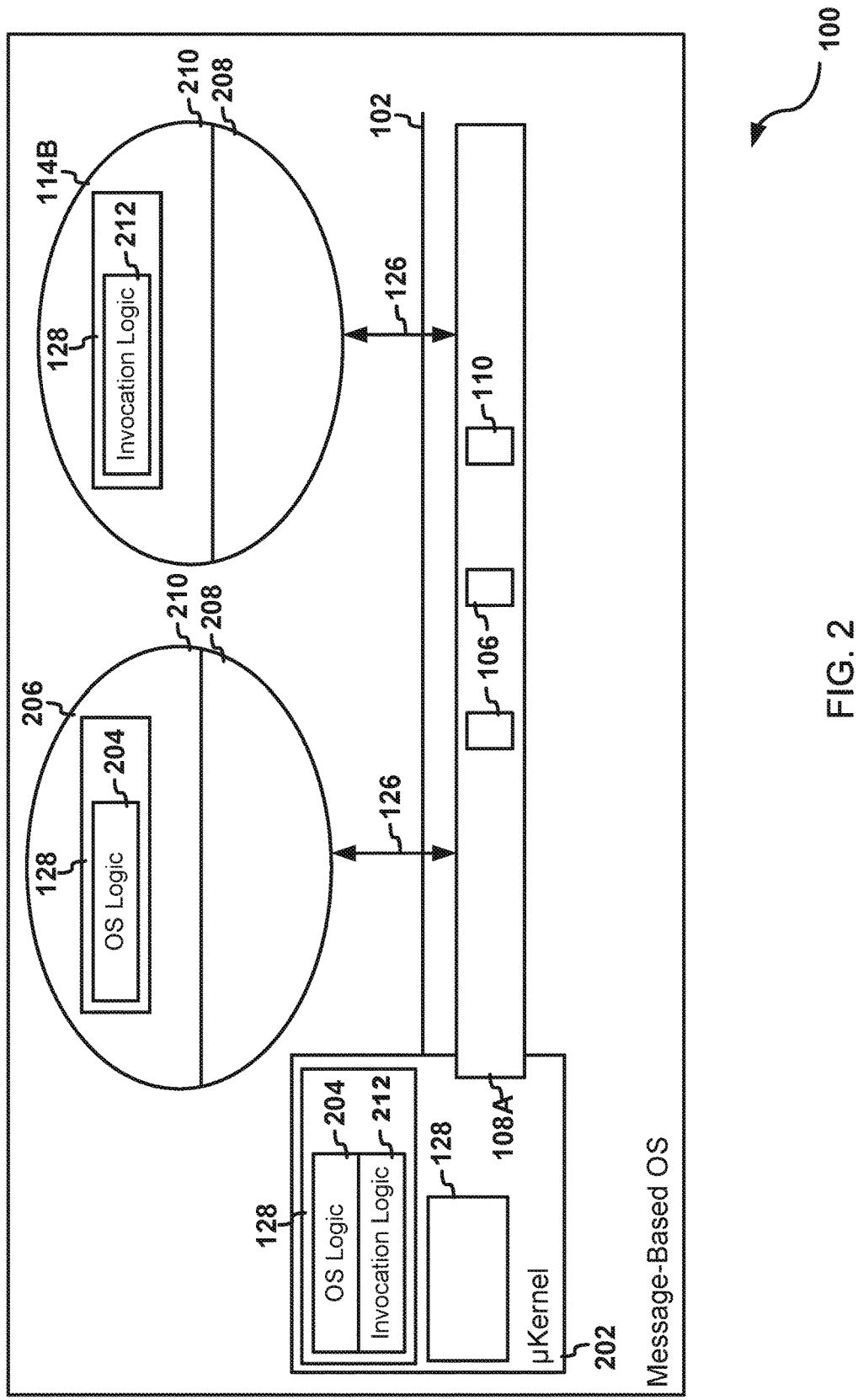
FIG. 2 illustrates an example of a system including a micro-kernel and an operating system process.

FIG. 2 illustrates an example of the system 100 including a micro-kernel 202 and an operating system process 206.

In some examples, the system 100 may include the micro-kernel 202. Operating system logic 204 may be divided between the micro-kernel 202 and the operating system process 206. In addition, the operating system logic 204 may be implemented in a kernel space 208 of an operating system process 206. Additionally or alternatively, the operating system logic 204 may be implemented in a user space 210 of the operating system process 206 (as illustrated in FIG. 2.) The operating system logic 204 may be responsive to messages 106 communicated over the communication channel 108A.

The mandatory access control 102 may be enforced by the system 100 to protect the operating system process 206 and the operating system logic 204. For example, the channel manager 128 may identify the operating system process 206 and the communication channel 108A. In addition, the channel manager 128 may identify the access rule 130 based on a channel policy 132. The access rule 130 may be indicative of a rule to communicate the message 110 to the operating system process 206 over the communication channel 108A. The channel manager 128 may control the access 126 to the communication channel 108A by the second process 114B based on the access rule 130. The second process 114B may be configured to invoke the operating system logic 204.

The operating system logic 204 may be a special form of logic dedicated to operating system functionality. The operating system logic 204 may be responsive to the messages 106 to provide operating system functionality outside of the micro-kernel 202. For example, the operation system logic 204 may implement certain aspects of inter-process communication, memory management, file system management, device driver management, or any other types of operating system tasks. Calls to the operating system logic 204 may be invoked with the messages 106.

The operating system process 206 may be a process that implements the operating system logic 204. The operating system process 206 may be responsive to a messages 106 communicated over the communication channel 108A. For example, the operating system process 206 may be responsive to a message communicated from a kernel 120 or a micro-kernel 202.

The kernel space 208 may be a privileged memory space. The kernel space may be reserved for running privileged logic in the message-based operating system. The user space 210 may a non-privileged memory space. The user-space may be a memory space where operating system logic 204 is executed in the system 100.

The logic may include invocation logic 212. The invocation logic 212 may invoke the logic of system objects by communicating messages 106 over the communication channels 108. For example, the invocation logic 212 of the second process 114B may communicate the message 110 over the communication channel 108A to invoke the operating system logic 204 executable in the operating system process 206.

Figure 3:
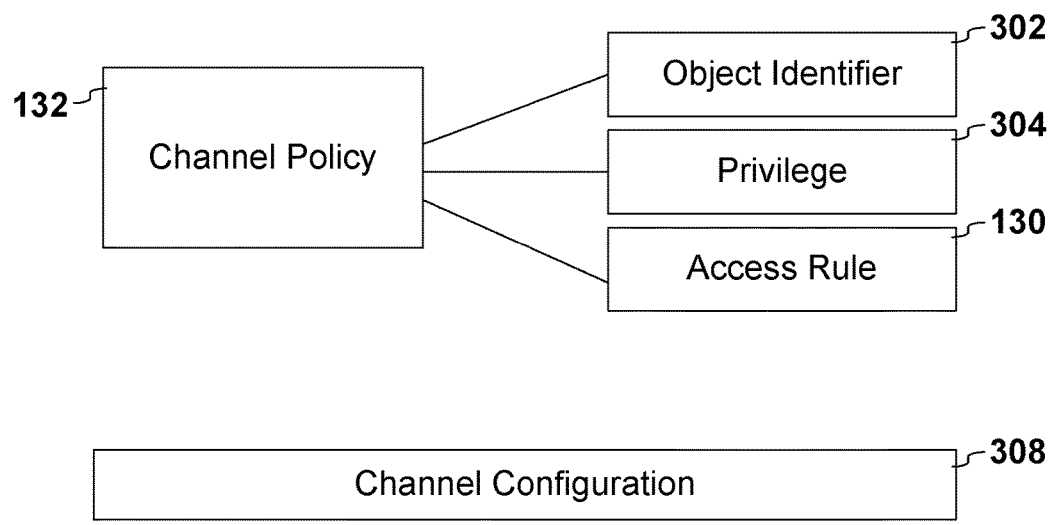
FIG. 3 illustrates an example of a channel policy and an access rule.

FIG. 3 illustrates an example of the channel policy 132 and the access rule 130. The channel policy 132 may be a security policy indicative of how to enforce the mandatory access control 102 in the system 100. For example, the channel policy 132 may specify how to control the access 126 to the communication channels 108 by the system objects.

In the example illustrated in FIG. 3, the channel policy 132 may be associated with, or include, an object identifier 302, a privilege 304, and an access rule 130. The object identifier 302 may be an identifier of a system object. For example, the object identifier 302 may be an identifier of any of the processes 114, any of the nodes 122, 124, any of the communication channels 108, or any combination thereof. Examples of the object identifier 302 include a process id, a channel id, a node id, a memory address, a descriptive label, or any other information used to identify a system object.

The privilege 304 may be an indication of an action taken in regard to controlling the access 126. For example, the privilege 304 may be an allowance. Alternatively, the privilege 304 may be a denial.

The access rule 130 may govern how to control the access 126 to the communication channel 108A. For example, the access rule 130 may designate how to control the access 126 to the communication channels 108 by the system objects configured. For example, the access rule 130 may indicate to the channel manager 128 to control the access to the communication channel 108A by the second process 114B.

In addition, the access rule 130 may designate how to control the access 126 to the communication channels 108 by the system objects configured to send messages 106 to the communication channels 108. In some examples, the access rule 130 may be an allowance of the access 126 to the communication channel 108A. Alternatively, the access rule 130 may be a refusal of the access 126 to the communication channel 108A.

In some examples the access rule 130 may comprise a connection rule. The connection rule may specify how to control a connection to the communication channel 108A. For example, the connection rule may be an allowance of a connection to the communication channel 108A. Alternatively, the connection rule may be a denial of a connection to the communication channel 108A.

Various combinations of the object identifier 302 and the privilege 304 may form the access rule 130. The access rule 130 may include at least one of the privilege 304 or the object identifier 302. For example, the access rule may include at least one object identifier 302. Additionally or alternatively, the access rule may include at least one privilege 304.

The channel policy 132 may be created based on a channel configuration 308. The channel configuration 308 may be a configuration that includes at least one of the channel policy 132, the object identifier 302, the privilege 304, or the access rule 130. The channel configuration 308 may be read by the channel manager 128 to establish the channel policy 132.

Various combinations of privileges, object identifiers, and access rules may establish the channel policy 132. Moreover, the channel policy 132 may be based on a channel configuration 308 of various formats and syntax.

In some examples, at least one of the processes 114 may be associated with a type. The type may be a label associated with various rights, privileges, or other permissions to communicate with other processes or communication channels 108. The channel policy 132 may include the type. The type may be associated with the object identifier 302 in the configuration file. Alternatively or in addition, the type may be passed to at least one of the processes 114 by a command line parameter.

Figure 4:
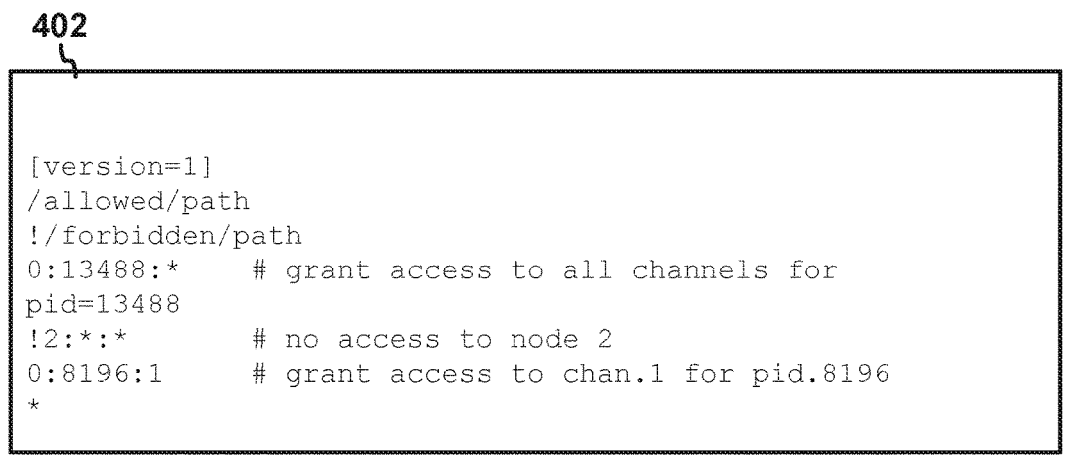
FIG. 4 illustrates an example of a channel configuration that includes configuration content.
Figure 4:
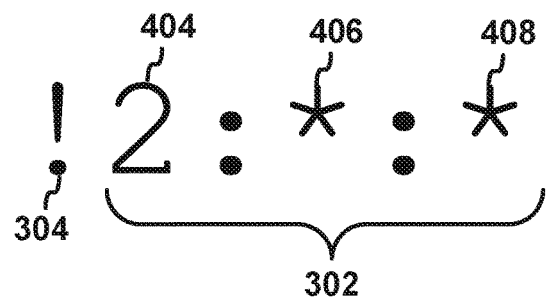

Access to the communication channels 108 may be controlled based on types associated with the processes 114. In some examples, the access rule 130, or other examples of privileges, may be associated with the types. For example, the first process 114A may be associated with a first type and a second process 114B may be associated with a second type. Communication between the first process 114A and the second process 114B over the communication channel 108A may be controlled based on the types associated with each process. For example, if the access rule 130 indicates that processes of the first type may connect to processes of the second type, then the first process 114A may be allowed to send messages over the communication channel 108A to the second process 114B. In other examples, types may be associated with the nodes 122, 124 or the communication channels 108. FIG. 4 illustrates an example of the channel configuration 308 that includes configuration content 402. The configuration content 402 may include the information necessary to establish the channel policy 132. The configuration content 402 may be information stored in a configuration file, a memory, a database, a large binary object, or any other type of computer storage resource. The configuration content 402 may be read by the system 100 to form the channel policy 132. For example, the configuration content 402 may be parsed by the channel manager 128.

The configuration content 402 may follow a syntax that can be read by the system 100 to establish the channel policy 132. The access rule 130 may be included in the configuration content 402. The object identifier 302 may include a node identifier 404, a process identifier 406, and a channel identifier 408. Identifiers 404, 406, 408 may identify a single object or multiple objects. In the example illustrated in FIG. 4, the node identifier 404 is "2", identifying a single node that an operating system identified as node "2", while the process identifier 406 is an asterisk identifying all of the processes 114 in the system 100. Additional combinations of privileges, node identifiers, processes identifiers, and channel identifiers may be implemented.

In the example illustrated in FIG. 4, the examples of the process identifier 406 include an asterisk indicating all processes and a process identifier, such as 13488, which an operating system assigned to a process when the process was created. In an alternative example, the node identifier 404, the process identifier 406, and the channel identifier 408 may include a label, such as a text label. For example, the label may be the word "network". The object identifier 302 may be, for example, "0:network:*" granting access to all channels of any process labeled "network". In some examples, a process may be labelled by passing the label as a parameter to the command line starting the process. For example, executing "on-l network io-pkt" in a command line of an operating system may start execution of the command "io-pkt" in a process and label the process with the label "network".

Identification of resources, such as processes, by a message based operating system may vary over time. For example, as the processes are destroyed or created, or the message-based operating system is restarted, identifiers assigned to the processes by the message-based operating system may vary. The label may provide a consistent identification of the node identifier 404, the process identifier 406, and the channel identifier 408 independent of the identification scheme of the message-based operating system. In addition, the node identifier 404, the process identifier 406, and the channel identifier 408 may include identical labels. For example, a process may create a channel and assign the channel a label that is identical to the label assigned to the process.

In some examples, the labels may be associated with a file path. The file path may include a path label. The path label may include text. For example, the path label may include text such as "/dev/socket". The file path may be included in the configuration content 402, a configuration file, or in a memory. The file path may be associated with any of the following, for example: the label of the node identifier 404, the process identifier 406, and the channel identifier 408. A process assigned to the file path may discover channels associated with the file path. Thus, for example, the process assigned to the file path "/dev/socket" may be permitted to establish communication with channels assigned to the file path "/dev/socket". In some examples, a process that creates the channel may associate the channel with the file path. The other processes may query the configuration content 402, or another source, to discover channels associated with the file path.

A rule may permit or restrict communication over the communication channels based on the file path. For example, the rule may permit a first group of processes assigned to the file path to discover or communicate over channels assigned to the file path. Alternatively or in addition, the rule may restrict a second group of processes that are not assigned to the file path from discovering or communicating over the channels assigned to the file path. The rule may include the access rule 130 or any other text that is grouped with the file path or the label of the node identifier 404, the process identifier 406, or the channel identifier 408. The rule may be included in the configuration content 402, the configuration file, or in the memory.

The rule may include additional rules that modify the labels that are associated with the file path. In some examples, the rule may provide for changing the label of any of the node identifier 404, the process identifier 406, and the channel identifier 408 based on the file path the label is bound to. For example, a process that was created with the label "network" may create a channel. The process or the message-based operating system 104 may associate the label of the channel with the path "/dev/socket". The rule may provide that if a process with the label "network" associates a channel to the path "/dev/socket" then the label of the channel is set to "network_socket". The channel policy 132 may be stored in any format. For example, the channel policy 132 may be stored in a binary format. Alternatively or in addition, the channel policy 132 may be stored in a text format comprising unparsed text like the configuration content 402 illustrated in FIG. 4. Any suitable format for describing the channel policy 132 may be used in the configuration content 402, so the format may differ from the format illustrated in FIG. 4.

Figure 5:
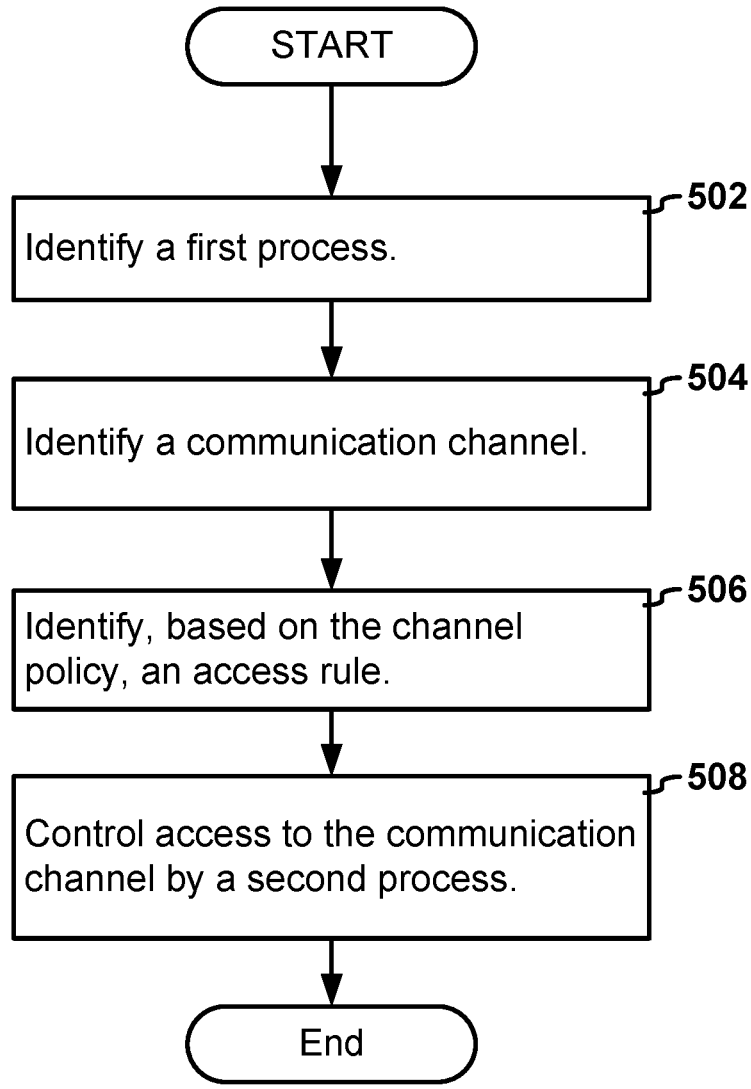
FIG. 5 illustrates a flow diagram of example logic of a system to enforce the mandatory access control in a message-based operating system.

FIG. 5 illustrates a flow diagram of example logic of the system 100 to enforce the mandatory access control 102 in the message-based operating system 104. The mandatory access control 102 starts, the first process 114A may be identified (502). The first process 114A may be configured to receive the message 110 via the communication channel 108A in the message-based operating system 104. Additionally or alternatively, the first process 114A may be an operating system process 206 configured to execute the operating system logic 204. The first process 114A may be identified based on an identifier of the first process 114A. Additionally or alternatively, the first process 114A may be identified based on the object identifier 302 designated in the channel policy 132.

The communication channel 108A may be identified (504). The communication channel 108A may be identified based on a channel identifier associated with the communication channel 108A. Additionally or alternatively, the communication channel 108A may be identified by the object identifier 302 designated in the channel policy 132.

The access rule 130 may be identified based on the channel policy 132 (506). The access rule 130 may provide a rule to govern the access 126 to the communication channel 108. For example, the access rule 130 may designate the allowance of the access 126 to the communication channel 108A by the second process 114B. Additionally or alternatively, the access rule 130 may designate a refusal of the access 126 to the communication channel 108A by the second process 114B.

The access 126 to the communication channel 108A may be controlled (508). For example, the access 126 to the communication channel 108A by the second process 114B may be controlled based on the access rule 130. In some examples, the access 126 may be controlled in the kernel 120 of the message-based operating system 104. In addition, the access 126 may be controlled in the micro-kernel 202.

The logic illustrated in FIG. 5 may be implemented in a different sequence. The logic illustrated in FIG. 5 may include additional, different, or fewer operations. For example, the logic illustrated in FIG. 5 may also include an operation to initialize first process 114A. The system may initialize the first process 114A during the launch of the message-based operating system. In some examples, the kernel 120 may initialize the first process 114A. Initializing the process may include spawning the process 114A.

In another example, the logic illustrated in FIG. 5 may also include an operation to configure the communication channel 108. The communication channel 108A may be configured to communicate the messages 106 between the processes 114. For example, the communication channel 108A may be configured to communicate the message 110 to the first process 114A.

In another example, the logic illustrated in FIG. 5 may also include an operation to read the channel configuration 308. The channel policy 132 may be generated based on a channel configuration 308. For example, the configuration content 402 of the channel configuration 308 may be parsed to generate the channel policy 132.

Figure 6:
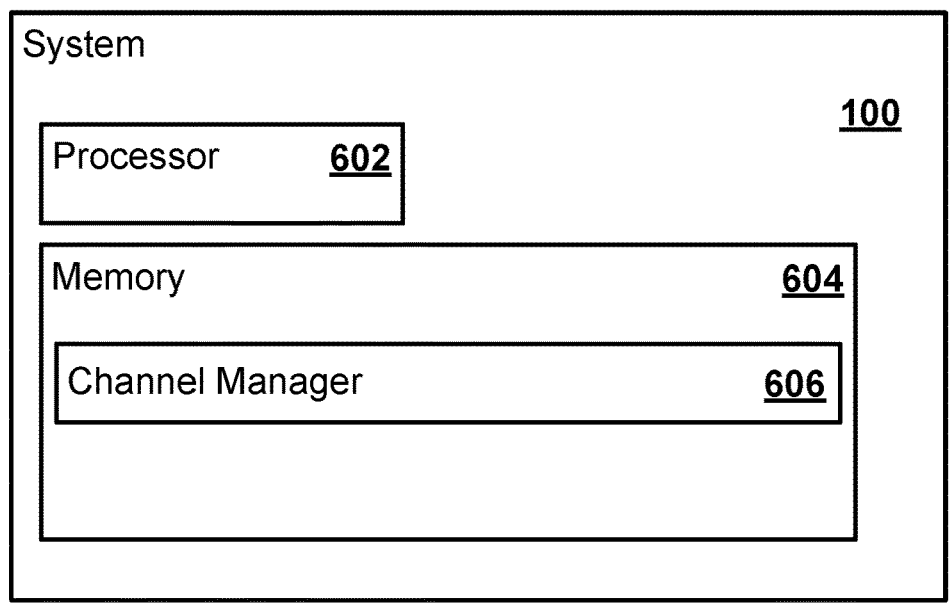
FIG. 6 illustrates an example of a system that includes a memory and a processor.

The system 100 may be implemented with additional, different, or fewer components than illustrated. For example, FIG. 6 illustrates an example of the system 100 that includes a memory 604 and a processor 602.

The processor 602 may be in communication with the memory 604. In one example, the processor 602 may also be in communication with additional elements, such as a network interface (not shown). Examples of the processor 602 may include a general processor, a central processing unit, a microcontroller, a server, an application specific integrated circuit (ASIC), a digital signal processor, a field programmable gate array (FPGA), and a digital circuit, analog circuit.

The processor 602 may be one or more devices operable to execute logic of the system 100. The logic of the system 100 may include computer executable instructions or computer code embodied in the memory 604 or in other memory that when executed by the processor 602, cause the processor 602 to perform the features implemented by the logic of the system 100. The computer code may include instructions executable with the processor 602.

The memory 604 may be any device for storing and retrieving data or any combination thereof. The memory 604 may include non-volatile and/or volatile memory, such as a random access memory (RAM), a read-only memory (ROM), an erasable programmable read-only memory (EPROM), or flash memory. Alternatively or in addition, the memory 604 may include an optical, magnetic (hard-drive) or any other form of data storage device.

The memory 604 may include at least one of a channel manager module 606, and/or any other component in the system 100 including: the first node 122, the second node 124, the logic 134, the communication channel 108A, the channel policy 132, the message-based operating system 104, the message 110, the kernel 120, the user space 210, the kernel space 208, the channel configuration 308, the object identifier 302, the privilege 304, or the access rule 130.

The channel manager module 606 may include any module configured with the logic of the system 100 to enforce mandatory access control. For example, the channel manager module 606 may include the channel manager 128.

Each component may include additional, different, or fewer components. For example, the logic 134 may only include operating system logic 204. As another example, the access rule 130 may only include the privilege 304.

The system 100 may be implemented in many different ways. Each module, such as the channel manager module 606, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 604, for example, that comprises instructions executable with the processor 602 or other processor to implement one or more of the features of the module. When any one of the module includes the portion of the memory that comprises instructions executable with the processor, the module may or may not include the processor. In some examples, each module may just be the portion of the memory 604 or other physical memory that comprises instructions executable with the processor 602 or other processor to implement the features of the corresponding module without the module including any other hardware. Because each module includes at least some hardware even when the included hardware comprises software, each module may be interchangeably referred to as a hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A system to enforce mandatory access control in a message-based operating system, the system comprising:
  a processor; and
  a channel manager module executable by the processor to identify a first process, the first process configured to receive a message via a communication channel in the message-based operation system, wherein calls to operating system logic are passed as messages over communication channels in the message-based operating system, wherein the channel manager module is further executable by the processor to identify the communication channel, wherein the channel manager module is further executable by the processor to identify, based on a channel policy, an access rule governing access to the communication channel, and wherein the channel manager module is further executable by the processor to control, in a kernel of the message-based operating system, the access to the communication channel by a second process based on the access rule, the second process configured to execute invocation logic, the invocation logic executable to send the message via the communication channel.

2. The system of aspects 1, wherein the first process is an operating system process, wherein the message is routed by the message-based operating system over the communication channel.

3. The system of any of aspects 1 to 2, wherein the operating system logic is responsive to the message in a user space.

4. The system of any of aspects 1 to 3, wherein the kernel is a micro-kernel.

5. The system of any of aspects 1 to 4, wherein the channel policy further comprises a type associated with the second process, wherein access to the communication channel is further controlled based on the type.

6. The system of any of aspects 1 to 5, wherein the channel manager module is further executable to determine that the communication channel is not subject to mandatory access control and to permit the access to the communication channel independently of the access rule in response to the communication channel not being subject to mandatory access control.

7. The system of any of aspects 1 to 6, wherein the access rule governing the access to the communication channel comprises a connection rule.

8. A method to enforce mandatory access control in a message-based operating system, the method comprising:
  identifying a first process configured to receive a message via a communication channel in the message-based operation system, wherein calls to operating system logic are passed as messages over communication channels in the message-based operating system;
  identifying the communication channel;
  identifying, based on a channel policy, an access rule governing access to the communication channel; and
  controlling, in a kernel of a message-based operating system, the access to the communication channel by a second process based on the access rule, the second process configured to execute invocation logic, the invocation logic executable to send the message via the communication channel.

9. The method of aspect 8, wherein the first process is an operating system process, wherein the message is routed by the message-based operating system.

10. The method of any of aspects 8 to 9, wherein the operating system logic is responsive to the message in a user space.

11. The method of any of aspects 8 to 10, wherein identifying the first process further comprises initializing the first process.

12. The method of any of aspects 8 to 11, further comprising reading a channel configuration to generate the channel policy.

13. The method of any of aspects 8 to 12, wherein the channel policy further includes at least one of a channel identifier representative of the communication channel, a process identifier representative of a process, or a node identifier representative of a node.

14. The method of any of aspects 8 to 13, wherein the access rule comprises at least one of a refusal of the access to the communication channel or an allowance of the access to the communication channel.

15. A computer readable medium comprising instructions executable by a processor, the instructions comprising:
  instructions executable to identify a first process configured to receive a message via a communication channel in a message-based operation system, wherein calls to operating system logic are passed as messages over communication channels in the message-based operating system;
  instructions executable to identify the communication channel;
  instructions executable to identify, based on a channel policy, an access rule governing access to the communication channel; and
  instructions executable to control, in a kernel of a message-based operating system, the access to the communication channel by a second process based on the access rule, the second process configured to execute invocation logic, the invocation logic executable to send the message via the communication channel.

16. The computer readable medium of aspect 15, wherein the first process is an operating system process, wherein the message is routed by the message-based operating system.

17. The computer readable medium of any of aspect 15 to 16, wherein the operating system logic is responsive to the message in a user space, where in the kernel is a micro-kernel.

18. The computer readable medium of any of aspect 15 to 17, wherein the access rule governing the access to the communication channel comprises a connection rule.

19. The computer readable medium of any of aspect 15 to 18, wherein the invocation logic of the first process is executable in a user space.

20. The computer readable medium of any of aspect 15 to 19, wherein the first process is located on a first node and the second process is located on a second node.

What is claimed is:

1. A system to enforce mandatory access control in a message-based operating system, the system comprising:
  a processor; and
  a channel manager module executable by the processor to
    identify a first process, the first process configured to receive a message via a communication channel in the message-based operating system, wherein calls to operating system logic are passed as messages over communication channels in the message-based operating system, wherein the channel manager module is further executable by the processor to identify the communication channel, wherein the channel manager module is further executable by the processor to identify, based on a channel policy, an access rule governing access to the communication channel, wherein the channel policy further includes at least one of a channel identifier representative of the communication channel or a node identifier representative of a node, wherein the channel manager module is further executable by the processor to control, in a kernel of the message-based operating system, the access to the communication channel by a second process based on the access rule, the second process configured to execute invocation logic, the invocation logic executable to send the message via the communication channel, and wherein the channel policy further comprises a type associated with the second process, wherein access to the communication channel is further controlled based on the type, and wherein the first process and the second process communicate over a network.

2. The system of claim 1, wherein the first process comprises an operating system process, wherein the message is routed by the message-based operating system over the communication channel.

3. The system of claim 1, wherein the operating system logic responsive to the message executes in a user space.

4. The system of claim 1, wherein the kernel comprises a micro-kernel.

5. The system of claim 1, wherein the channel manager module is further executable to determine that the communication channel is not subject to mandatory access control and to permit the access to the communication channel independently of the access rule in response to the communication channel not being subject to mandatory access control.

6. The system of claim 1, wherein the access rule governing the access to the communication channel comprises a connection rule.

7. A method to enforce mandatory access control in a message-based operating system, the method comprising:
identifying a first process configured to receive a message via a communication channel in the message-based operating system, wherein calls to operating system logic are passed as messages over communication channels in the message-based operating system;
identifying the communication channel;
identifying, based on a channel policy, an access rule governing access to the communication channel, wherein the channel policy further includes at least one of a channel identifier representative of the communication channel or a node identifier representative of a node; and
controlling, in a kernel of the message-based operating system, the access to the communication channel by a second process based on the access rule, the second process configured to execute invocation logic, the invocation logic executable to send the message via the communication channel, wherein the channel policy further comprises a type associated with the second process, wherein access to the communication channel is further controlled based on the type, and wherein the first process and the second process communicate over a network.

8. The method of claim 7, wherein the first process comprises an operating system process, wherein the message is routed by the message-based operating system.

9. The method of claim 7, wherein the operating system logic responsive to the message executes in a user space.

10. The method of claim 7, wherein identifying the first process further comprises initializing the first process.

11. The method of claim 7, further comprising reading a channel configuration to generate the channel policy.

12. The method of claim 7, wherein the channel policy further includes a process identifier representative of a process.

13. The method of claim 7, wherein the access rule comprises at least one of a refusal of the access to the communication channel or an allowance of the access to the communication channel.

14. A non-transitory computer readable medium comprising instructions executable by a processor, the instructions comprising:
instructions executable to identify a first process configured to receive a message via a communication channel in a message-based operating system, wherein calls to operating system logic are passed as messages over communication channels in the message-based operating system;
instructions executable to identify the communication channel;
instructions executable to identify, based on a channel policy, an access rule governing access to the communication channel, wherein the channel policy further includes at least one of a channel identifier representative of the communication channel or a node identifier representative of a node; and
instructions executable to control, in a kernel of the message-based operating system, the access to the communication channel by a second process based on the access rule, the second process configured to execute invocation logic, the invocation logic executable to send the message via the communication channel, wherein the channel policy further comprises a type associated with the second process, wherein access to the communication channel is further controlled based on the type, and wherein the first process and the second process communicate over a network.

15. The non-transitory computer readable medium of claim 14, wherein the first process comprises an operating system process, wherein the message is routed by the message-based operating system.

16. The non-transitory computer readable medium of claim 14, wherein the operating system logic responsive to the message executes in a user space, and wherein the kernel comprises a micro-kernel.

17. The non-transitory computer readable medium of claim 14, wherein the access rule governing the access to the communication channel comprises a connection rule.

18. The non-transitory computer readable medium of claim 14, wherein the invocation logic of the second process is executable in a user space.

19. The non-transitory computer readable medium of claim 14, wherein the first process is located on a first node and the second process is located on a second node.

* * * * *